United States Patent [19]

Antik

[11] Patent Number: 5,353,931
[45] Date of Patent: Oct. 11, 1994

[54] PACKAGE FOR RECORDED VIDEO DEVICE

[76] Inventor: Alan L. Antik, 6 Sunny Meadow Ct., Baltimore, Md. 21209

[21] Appl. No.: 940,043

[22] Filed: Sep. 3, 1992

Related U.S. Application Data

[63] Continuation-in-part of Ser. No. 836,354, Feb. 18, 1992, which is a continuation-in-part of Ser. No. 679,211, Apr. 2, 1991, abandoned.

[51] Int. Cl.⁵ .................... B65D 5/66; B65D 85/57
[52] U.S. Cl. .................... 206/387; 206/232; 229/92.8; 229/921
[58] Field of Search ............ 229/92, 92.8, 164, 193, 229/223, 921; 206/45.31, 232, 387, 424, 492

[56] References Cited

U.S. PATENT DOCUMENTS

| | | | |
|---|---|---|---|
| 1,084,851 | 1/1914 | Ford . | |
| 2,646,876 | 7/1953 | Sparks | 229/92.8 |
| 2,758,780 | 8/1956 | Imbs . | |
| 2,789,746 | 4/1957 | Hovland | 229/193 |
| 2,799,391 | 7/1957 | Eisner | 206/232 |
| 3,085,736 | 4/1963 | Meyers | 229/193 |
| 3,324,998 | 6/1967 | Farquhar | 206/46 |
| 3,682,297 | 8/1972 | Austin et al. | 206/45.14 |
| 4,083,454 | 4/1978 | O'Neill | 206/605 |
| 4,113,086 | 9/1978 | Forbes, Jr. | 206/45.14 |
| 4,121,752 | 10/1978 | Ravotto et al. | 229/27 |
| 4,134,495 | 1/1979 | Friedman | 206/387 |
| 4,307,806 | 12/1981 | Haubert | 206/387 |
| 4,416,377 | 11/1983 | Swanberg | 229/193 |
| 4,431,129 | 2/1984 | Froom | 229/33 |
| 4,433,780 | 2/1984 | Ellis | 206/232 |
| 4,438,846 | 3/1984 | Stylianou | 206/387 |
| 4,501,359 | 2/1985 | Yoshizawa | 206/387 |
| 4,643,315 | 2/1987 | Hopwood et al. | 229/193 |
| 4,676,430 | 6/1987 | Wischusen, III et al. | 229/140 |
| 4,688,677 | 8/1987 | Roccaforte | 229/193 |
| 4,750,609 | 6/1988 | Felis | 229/921 |
| 4,821,881 | 4/1989 | Yabe | 206/387 |
| 4,905,820 | 3/1990 | Hart et al. | 206/45.14 |
| 4,978,009 | 12/1990 | Pany | 206/620 |
| 4,998,985 | 3/1991 | Sankey | 206/387 |
| 5,005,701 | 4/1991 | Dutcher | 206/491 |
| 5,096,113 | 3/1992 | Focke | 229/87.05 |

FOREIGN PATENT DOCUMENTS

| | | | |
|---|---|---|---|
| 2516720 | 10/1976 | Fed. Rep. of Germany | 206/232 |
| 4504 | of 1915 | United Kingdom | 229/193 |
| 3983 | 1/1916 | United Kingdom | 229/193 |
| 736174 | 9/1955 | United Kingdom | 229/193 |

OTHER PUBLICATIONS

"What Happened To Advertising?"; Mark Landler, Walecia Konrad, Zachary Schiller, Lois Therrien, and bureau reports; Business Week/Sep. 23, 1991; pp. 66–72.
"Tell Your VCR The Commercial is In the Mail"; David A. Marklewicz; The Detroit News/Jun. 28, 1991.

*Primary Examiner*—Gary E. Elkins
*Attorney, Agent, or Firm*—Leonard Bloom

[57] ABSTRACT

A package for containing a video recording formed from a sheet of material. The sheet of material is folded to form a box-like portion. A covering flap extends over and is removably attached to one sidewall providing an envelope appearance. A cut-out portion is formed on the one sidewall wherein the contents of the package are available for access when the package is opened by lifting the cover. A removable segment may be disposed in the cut-out portion to be adhered to the covering flap. A panel is foldably joined to the edge of the first sidewall, the panel being disposed inside the package adjacent to the sidewall. Written material may be inserted between the sidewall and the foldable panel.

8 Claims, 6 Drawing Sheets

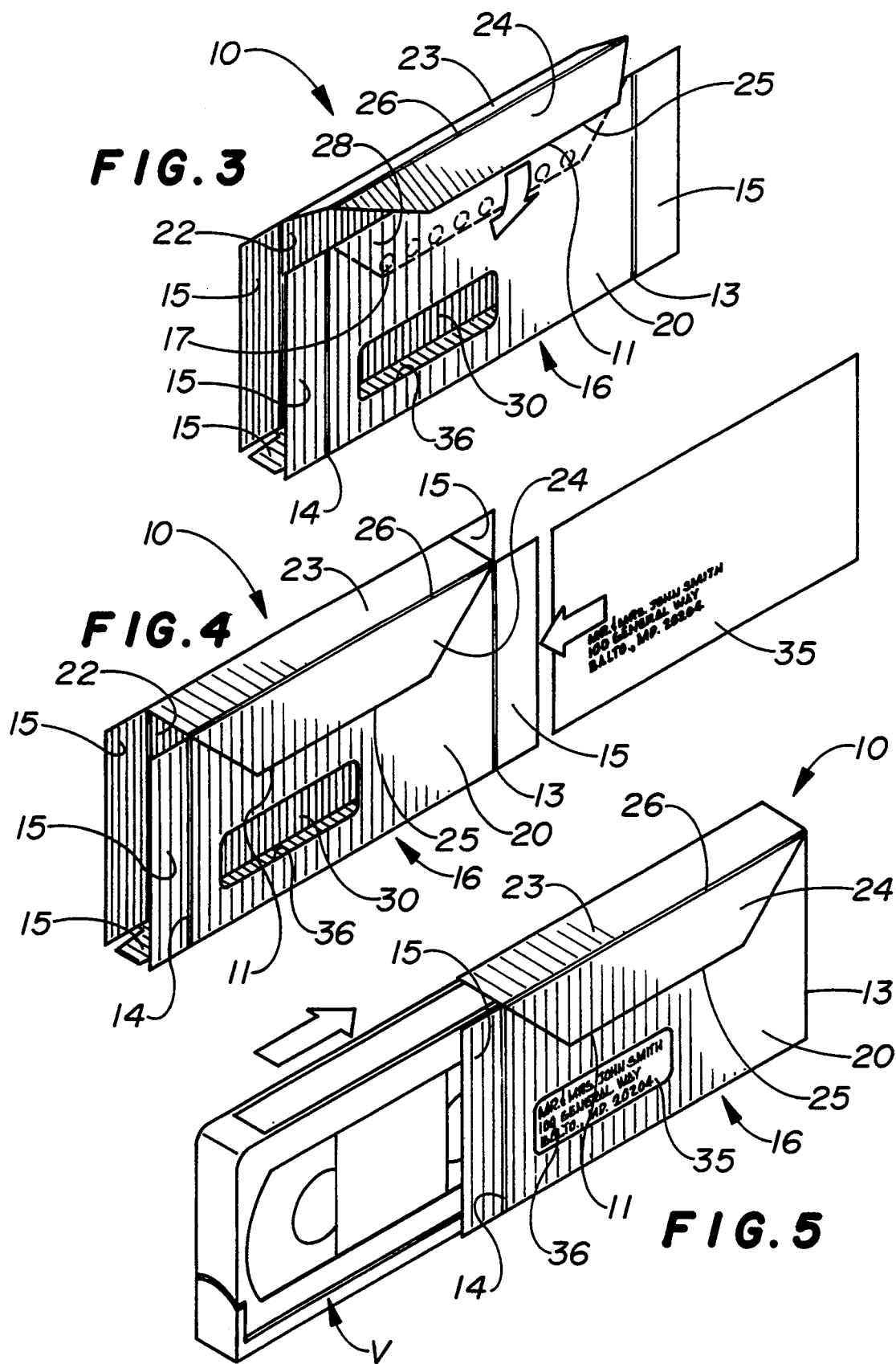

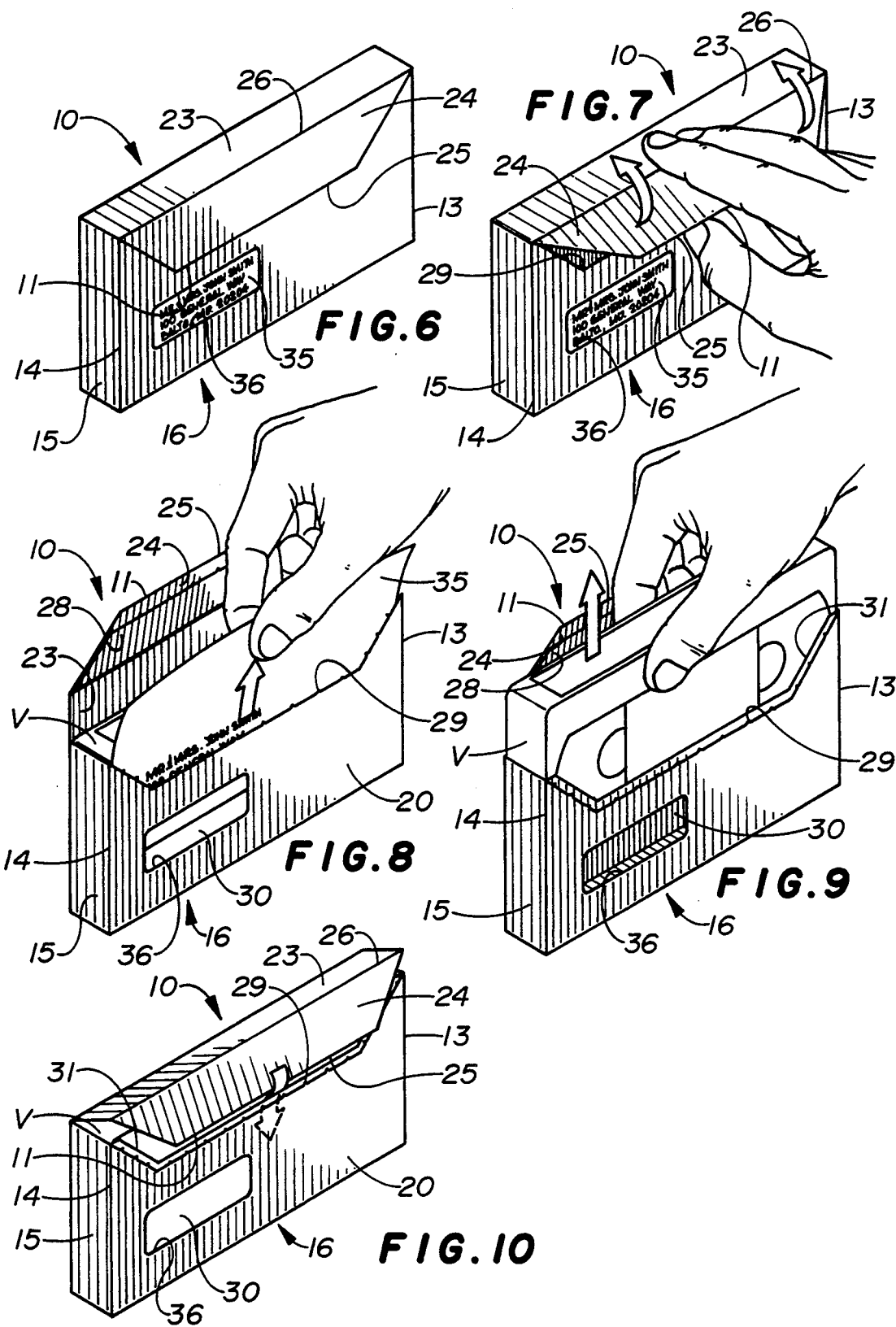

PACKAGE FOR RECORDED VIDEO DEVICE

CROSS-REFERENCE TO RELATED APPLICATION

The present application is a continuation-in-part of U.S. patent application Ser. No. 836,354 pending filed Feb. 18, 1992 which is a continuation-in-part of U.S. patent application Ser. No. 679,211, filed Apr. 2, 1991, now abandoned, the contents of which are hereby incorporated herein and made a part hereof.

FIELD OF THE INVENTION

The present invention relates to packaging and, in particular, to wrap-around packaging for recorded video means or the like which may be used for general promotion purposes and which are adapted for use in machines in use in the industry for packaging recorded video means.

BACKGROUND OF THE INVENTION

Video cassettes and similar types of audio and video tapes are usually packaged in a paperboard sleeve which is open at one end. The cassette is slid into the sleeve to provide a degree of protection during handling. The sleeve also serves as a means of identifying the contents of the cassette listing the performing artists (if any) and other information.

More recently, video cassettes have been considered as a powerful medium for direct mail advertising as well as other promotional programs ("Business Week", Sep. 23, 1992, pages 67–72, "The Detroit News", Jun. 28, 1991). In this role, the package for the cassette must provide adequate protection during shipping and particularly for mass mailings through the U.S. Postal System. Further, it is most desirable for the package to provide sufficient space for a printed advertising message as well as what is deliverable on the video tape. The printed advertising message greatly enhances the overall communication and persuasion capabilities of the unit. Also, means must be included in the package to insure that the recipient is exposed to the advertising on the package before having access to the cassette. In addition, the capability to insert a personalized letter further enhances the communication capability of the unit. Since the recipient of these units are usually not charged any fees, a low unit cost is a key factor in the expansion of direct mail video as a marketing tool. In addition to direct mail advertising, video cassettes may be used for catalog information, directions, promotions, video magazines, greeting cards and other commercial ventures. Such packaging could also be useful in marketing of the cassette as a video letter on which a consumer could tape an individual, personal message and could mail to family, friends and others.

The most commonly currently available sleeve-type pack is not very satisfactory for mailing and provides only limited space on the two broad panels for advertising. On the infrequent occasions when this sleeve is used for mailings, it is shrink wrapped. However, for most mailings the sleeve is further protected by an overpack such as a carton, bubble bag or jiffy bag. Since these outer wraps are not very suitable for advertising, additional advertising literature is often inserted into the pack. The additional costs of the overwrap, advertising literature and manual labor to provide a reliable mailing unit and a more persuasive advertising vehicle greatly diminishes the marketers' ability to use this vehicle broadly and in large quantities.

An elegant approach to solving this problem was disclosed in U.S. patent application Ser. No. 679,211. In that disclosure a package is provided that gives proper protection to the cassette, expands the print space and the general capability to deliver effective advertising. At the same time, this package has lower unit costs due to the elimination of additional materials and manual labor that were commonly needed in other packaging.

The package was further improved as disclosed in U.S. patent application Ser. No. 836,354 to provide additional advertising space and due to design changes, had lower unit costs.

However, the package still had shortcomings for ease of inclusion of letters to the addressee and for simplicity of production and assembly. Improvements for these aspects of the package are still needed.

SUMMARY OF THE INVENTION

The principal object of the present invention is to provide a single package for a recorded video means and the like which not only protects the recorded video means during the handling and mailing thereof and which is capable to deliver effective advertising, but which is also adapted for use with machines commonly employed in the industry for packaging recorded video means.

Another principal object of the present invention is to provide a single package for a recorded video means and the like which protects the recorded video means during handling and mailing.

It is still another object of the present invention to provide a package, which when opened, has cut-out portions therein which provide access to the recorded video means and to the printed material.

It is yet another objective of the invention to provide an alternative structure that makes the package more attractive for direct mail advertising or retail video sales.

It is another object of the invention to make the package reclosable.

It is another object of the current invention to provide a structure so that letters or other materials can be automatically inserted in the package, the materials held in place, and the package then automatically sealed utilizing existing equipment.

It is a primary object of the present invention to lower costs by accomplishing all the objectives states with one inexpensive package, easy to fabricate, that can be utilized on currently available automatic cassette sleeve loading equipment, thereby eliminating additional components and manual labor.

In accordance with the teachings of the present invention there is disclosed herein a package for containing a recorded video means or the like. This package includes a compartment having adjoining first, second, third and fourth sidewalls and two end walls. The sidewalls and the end walls are closable to retain therein the recorded video means or the like.

The package further includes a covering flap having a first end and a second opposite end. The first end of the covering flap is joined to the fourth sidewall. The second end of the covering flap extends over the box-like portion and is removably attached to the first sidewall to provide an envelope appearance for the package. The first sidewall has an edge; a cut-out portion is formed on said edge. In this manner, when the covering flap is folded over the first sidewall and is removably attached to the first sidewall, the cut-out portion of the edge on the first sidewall is covered by the covering flap and the package is closed. When the covering flap is disconnected from the first sidewall, the package may be opened to permit access to the recorded video means within the package through the cut-out portion on the edge of the first sidewall.

The box-like portion is collapsible, such that when collapsed, the application of pressure on two opposing sidewalls expands the package for permitting insertion therein of the recorded video means.

The package further includes a panel foldably joined to the edge of the first sidewall. The panel is disposed inside the package adjacent to the first sidewall. In this manner, an addressed letter may be removably inserted between the first sidewall and the panel such that a recipient of the package may be provided with advertising, informational or instructional material contained in the letter and related to the recorded video means.

In further accordance with the teachings of the present invention, a package for containing recorded means or the like is provided. The package includes a single sheet of foldable material having a first end and a second opposite end, the sheet further having a first side and a second opposite side. The sides are substantially perpendicular to the respective ends. The sheet further has a plurality of folds formed therein extending from the first side to the second side of the sheet, whereby respective panels are defined. The panels have substantially parallel edges which extend from the first side to the second side of the sheet, wherein the sheet may be folded along the folds to form a substantially box-like portion having four sidewalls. Each sidewall of the box-like portion is formed by a respective panel. The box-like portion has a portion of the sheet including the first end thereof being integral with one of the sidewalls and extending outwardly therefrom. The portion of the sheet is foldable to form a covering flap. The covering flap is removably secured to a sidewall adjoining the second end of the sheet to close the package and to provide protection during handling of the package. The covering flap extends over the box-like portion to provide an envelope appearance to the package. The sides of the sheet forming the box have a plurality of end tabs formed thereon. The end tabs are foldable, such that when folded, the tabs overlap to define end walls of the box for selectively retaining therein the recorded video means. Means are provided for fastening the tabs, so that the tabs are overlapped for retaining therein the recorded video means and for maintaining the integrity of the package. Means are also provided for the rapid and simple opening of the covering flap, whereby when the covering flap is opened, access is provided to the contents of the box-like portion.

These and other objects of the present invention will become apparent from a reading of the following specification, taken in conjunction with the enclosed drawings.

BRIEF DESCRIPTION OF THE DRAWINGS

FIG. 3 is a perspective view of the sheet of foldable material further folded.

FIG. 4 is a perspective view of the letter being inserted into one end of the box-like portion.

FIG. 5 is a perspective view of the recorded video means being inserted into the opposite end of the box-like portion.

FIG. 6 is a perspective view of the completely sealed package containing the letter and the recorded video means.

FIG. 7 is a perspective view of the covering flap being opened and showing the cut-out portion of the sidewall.

FIG. 8 is a perspective view showing removal of the letter.

FIG. 9 is a perspective view showing removal of the recorded video means.

FIG. 10 is a perspective view showing insertions of the covering flap into the cut-out portion of the sidewall to reclose the package.

DESCRIPTION OF THE PREFERRED EMBODIMENTS

Figure 1:
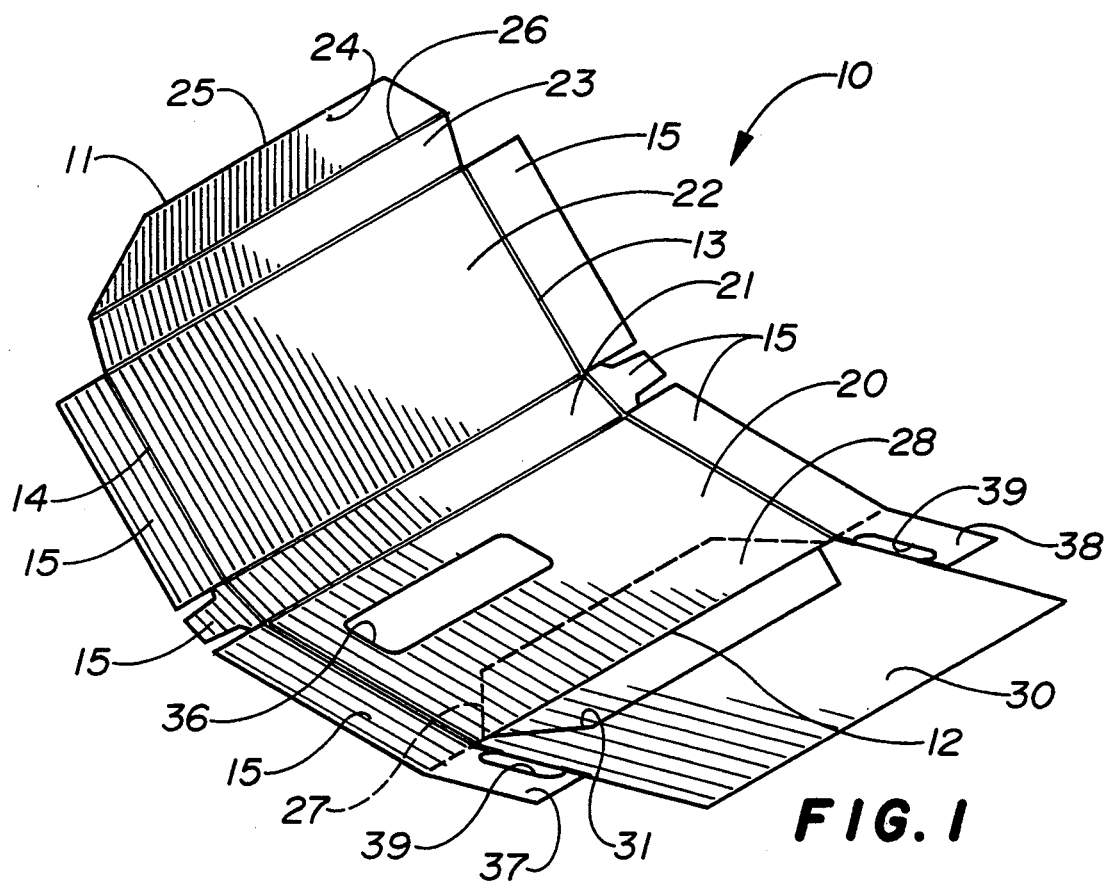
FIG. 1 is a perspective view of the sheet of foldable material prior to being folded to form the package.
Figure 2:
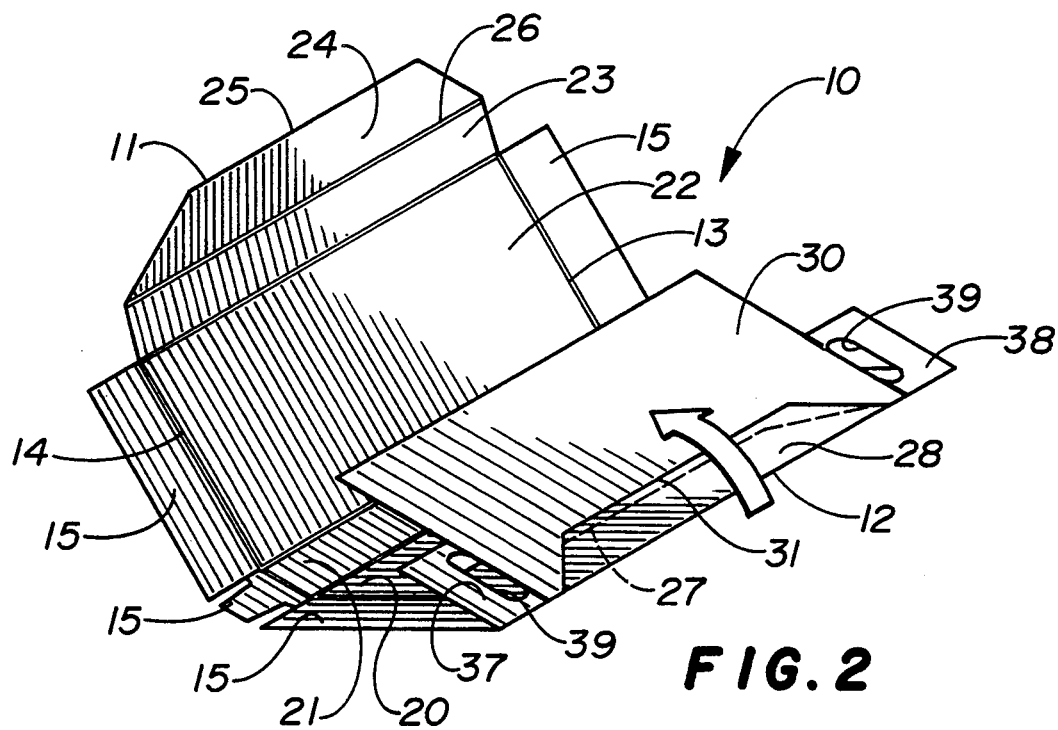
FIG. 2 is a perspective view of the sheet of foldable material partially folded.

Referring now to FIGS. 1-6, the forming of the package for containing a recorded video means and the like is shown. The package is preferably formed from a single sheet of material (FIG. 1) for cost efficiency, ease of manufacture and assembly. The material may be paperboard, plastic or any other material which is inexpensive, easily folded, provides protection for the contents of the package and on which printing, graphics and instructions may be affixed. The material preferably is die-cut into a form which has a first end 11, a second opposite end 12, a first side 13 and a second opposite side 14. The sides 13, 14 are substantially perpendicular to the respective ends. Extending outwardly from the sides 13, 14 of the sheet of material are a plurality of tabs 15 which, when the sheet is folded, serve as the ends of a box-like portion 16. The tabs 15 may be folded to overlap on the respective ends to retain contents within the box-like or sleeve-like compartment 16. The box-like portion 16 has four sidewalls 20, 21, 22, 23, all formed from panels of the sheet of material when the sheet is folded (FIGS. 1-4). The box-like portion has four walls to provide structural integrity in order for a standard assembly machine to shape an open box from the collapsed form as will be described. The first end 11 of the sheet of material has a covering flap 24 formed thereon. The covering flap 24 has a first end 25 and a second end 26. The second end 26 is joined to the fourth sidewall 23. The first end 25 of the covering flap 24 overlaps the box-like portion 16 and is removably attached to the first sidewall 20 as will be described. The covering flap 24 provides an envelope appearance for the package 10. The edge of the first sidewall 20 has recessed portion 29 formed thereon. The covering flap 24 is folded over the box-like portion 16 and removably attached to the first sidewall 20 so that the covering flap 24 completely covers the recessed portion 29 when the package 10 is closed. The covering flap 24 may be disconnected from the first sidewall 20 when the package is opened to uncover the recessed portion 29 and provide access to the contents of the package 10 as will be described.

In a preferred embodiment, a segment 28 of the first sidewall is removably attached to and disposed in the recessed portion 29 of the first sidewall 20. A plurality of spaced-apart perforations or slits 27 may be formed between the segment 28 and the edge of the first sidewall 20 on which the recessed portion 29 is formed. These perforations or slits 27 facilitate separation of the segment 28 from the recessed portion. The covering flap 24 is folded over the first sidewall 20 and a portion of the covering flap is adhered by a plurality of glue spots 17 or otherwise secured to the segment 28 with the first end 25 of the covering flap extending beyond the segment 32 when the package 10 is formed. To open the package 10, the first end 25 of the covering flap 24 is lifted outwardly. In so lifting, the segment 28 is separated from the first sidewall 20 along the plurality of perforations or slits 27 and the segment 28 remains attached to the covering flap 24. The recessed portion 29 in the first sidewall 20 permits access to the contents of the package 10. The covering flap 24 is reinforced with the segment 28 attached thereto and the covering flap 24 may be reinserted into the cut-out portion 29 in the first sidewall 20 for reuse of the package 10 and for storage of the recorded video means.

A foldable panel 30 is joined to the second end 12 of the rectangular sheet of material, the foldable panel 30 adjoining the first sidewall 20. The foldable panel 30 is folded adjacent to the first sidewall 20 such that the foldable panel 30 is inside the package 10 when the sheet of material is folded to form the box-like portion 16. In a preferred embodiment, the foldable panel 30 has a cut-out portion 31 therein. The cut-out portion 31 in the foldable panel 30 is approximately a mirror image of the recessed portion 29 and of the segment 28 in the first sidewall 20 and the recessed portion 31 is side-by-side with the segment 28 when the foldable panel 30 is disposed inside the package 10. In this manner, when the covering flap 24 is disconnected from sidewall 20 on the closed package 10, the segment 28 is removed so that the recessed portion 29 on the first sidewall 20 and cutout portion 31 on the foldable panel 30 communicate with one another. This permits access to the contents of the package 10.

Alternately, the first sidewall 20 may be formed with a recessed portion 29 not having a removable segment 28. In this embodiment, the first end 25 of the covering flap 24 is removably attached to the lip of the recessed portion on the first sidewall 20. A plurality of spaced-apart adhesive spots 17 may be used for the removable attachment, however, other means may be used and the removable attachment is not limited to adhesive spots.

The package 10 may be used with a standard assembly machine. This equipment, common to the packaging industry may be cartoning machinery which forms and loads cassettes into sleeves. The machinery is both automatic and semi-automatic and includes features of continuous carton-blank feeding, carton forming, glue sealing and carton closing. Cartons of different sizes are accommodated by the standard machinery. The machinery provides a means to press against two opposing sidewalls of a collapsed form of the box-like portion 16 to form an open container.

The contents of the package 10 are inserted into the open container. Written material 35 such as an addressed letter with advertising, informational and/or instructional material related to the recorded video means V is inserted from one end of the open container (FIG. 4). The written material 35 is received in the space between the first sidewall 20 and the foldable panel 30 so that the written material 35 is securely contained within the package 10. Standard assembly machinery is available to automatically insert the written material 35 into the open container, although the written material 35 may be inserted manually. If desired, a window 36 may be formed in the first sidewall 30 so that an address inscribed on the written material 35 may be visible through the window 36 to facilitate delivery of the package 10. The foldable panel 30 has a first side tab 37 and a second side tab 38 formed thereon. When the foldable panel 30 is folded adjacent to the first sidewall 20 within the package 10, the side tabs 37, 38 are disposed adjacent to and in contact with the tabs 15 on the first sidewall 20. These side tabs 37, 38 may have openings 39 formed at the junction of the respective side tab 37, 38 with the first sidewall 20 to facilitate folding of the side tabs 37, 38 by reduction of the mass of tab which is folded. If desired one side tab 38 may be secured, such as by glue, to the adjacent tab 15 on the first sidewall 20. In this manner, when the written material 35 is inserted between the first sidewall 20 and the foldable panel 30, the written material 35 is contained in the desired position and insertion is limited, the written material 35 being prevented from being inserted too far into the space. If desired, a sharp cutting edge may be used to sever the fold line between the side tab 37 and the foldable panel 30 so that the foldable panel 30 is secured to the first sidewall 20 only by the connection between the side tab 38 and the tab 15 on the first sidewall 20. The opposite end of foldable panel 30 thereby is unsupported and rests on the opposite third sidewall 22 providing a large space for insertion of the written material 35. When the recorded video means V is inserted into the open container, the opposite end of the foldable panel 30 is moved upwardly to the first sidewall 20 as will be described.

The recorded video means V is inserted into an end of the open container opposite to the one end into which the written material was inserted (FIG. 5). The recorded video means V is thereby retained between the second, third and fourth sidewalls 21, 22, 23 and the foldable panel 30. Insertion of the recorded video means in this manner, forces the opposite end of the foldable panel 30 upwardly to be disposed adjacent to the first sidewall 20 in the situation where said opposite end was unsupported as previously described.

The tabs 15 may be folded to close the open container with the recorded video means V and the written material 35 inside the package 10.

Referring now to FIGS. 6-10, when the covering flap 24 is lifted to open the package 10, the written material is readily accessible by being disposed within the recessed portion 29 and the cut-out portion 31 of the first sidewall 20 of the foldable panel 30, respectively. The written material 35 can be easily grasped by the recipient and removed for reading.

Also, the recorded video means V is readily accessible through the cut-out portions 27, 31 and may be easily grasped and slidably removed. Further, the package 10 may be reused by reinsertion of the recorded video means V and closure of the covering flap 24.

Figure 11:
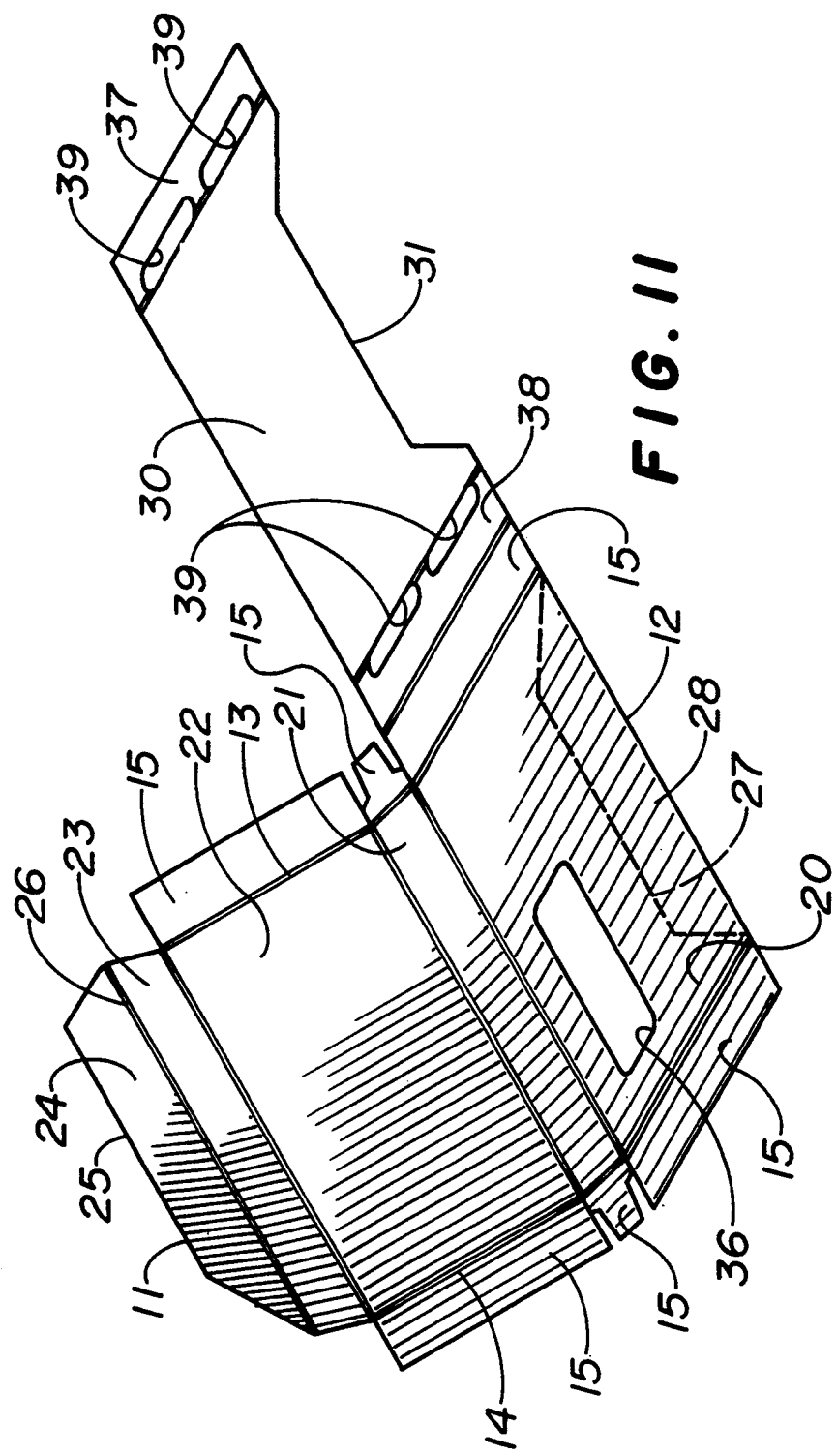
FIG. 11 is a perspective view of another embodiment of the sheet of foldable material showing the panel disposed on a side of the sheet.

In an alternate embodiment (FIG. 11), the sheet of foldable material is "L" shaped. The edge of the first sidewall 20 is perpendicular to the end of the first sidewall 20 on which the tab 15 is formed. The side of the foldable panel 30 has a side tab 38 joined to the tab 15 on first side 13 of sheet of material. The opposite end of the foldable panel 30 has a second side tab 37 formed thereon. The side tabs 37 and 38 have openings 39 formed therein to facilitate folding of the side tabs 37, 38 by removal of a portion of the respective side tabs 37, 38 which would otherwise limit complete folding of the tabs. If desired, the foldable panel 30 may be a separate sheet of material having a side tab 38 which is connected to the tab 15 on the first side 13 of sheet of material from which the package is formed. The foldable panel 30 is folded adjacent to the first sidewall 20 such that the foldable panel 30 is inside the box-like portion 16 as in the previously described embodiment. Also included in the alternate embodiment is a recessed portion 29 and a removable segment 28 therein. The foldable panel 30 also has a recessed portion 31 which is aligned with the cut-out portion 29 in the first sidewall 20 when the foldable panel 30 is disposed in the package 10 as with the previously described embodiments. The alternate embodiment has the advantage of controlling the disposition of the written material 35 to be inserted within the package 10 without requiring any further operations. The connection between the tab 15 on the first side 13 of the sheet and the tab on the foldable panel prevents movement of the written material 35 beyond said tabs when the written material 35 is inserted from the opposite side of the box-like portion 16.

If desired, the foldable panel 30 may also serve as a removable card containing written material. In this embodiment, the foldable panel has no cut-out portion. If side tabs are provided, they are perforated and easily separable. When, the sheet of material is folded, to form the box-like portion 16, the foldable panel is disposed adjacent to the first sidewall 20 and the recorded video means V is inserted in the box-like portion 16 as previously described. The covering flap 24 is secured to the removable segment 28 to close the package 10. When the package 10 is opened by lifting the covering flap, the removal segment 28 is separated from the first sidewall 20 and remains attached to the covering flap 24, leaving a recessed portion in the first sidewall 20. The foldable panel 30 may then be grasped and slidably removed from the box-like portion 16. The foldable panel 30 is partially raised from the box-like portion 16 when the segment 20 is separated from the first sidewall 20.

Figure 12:
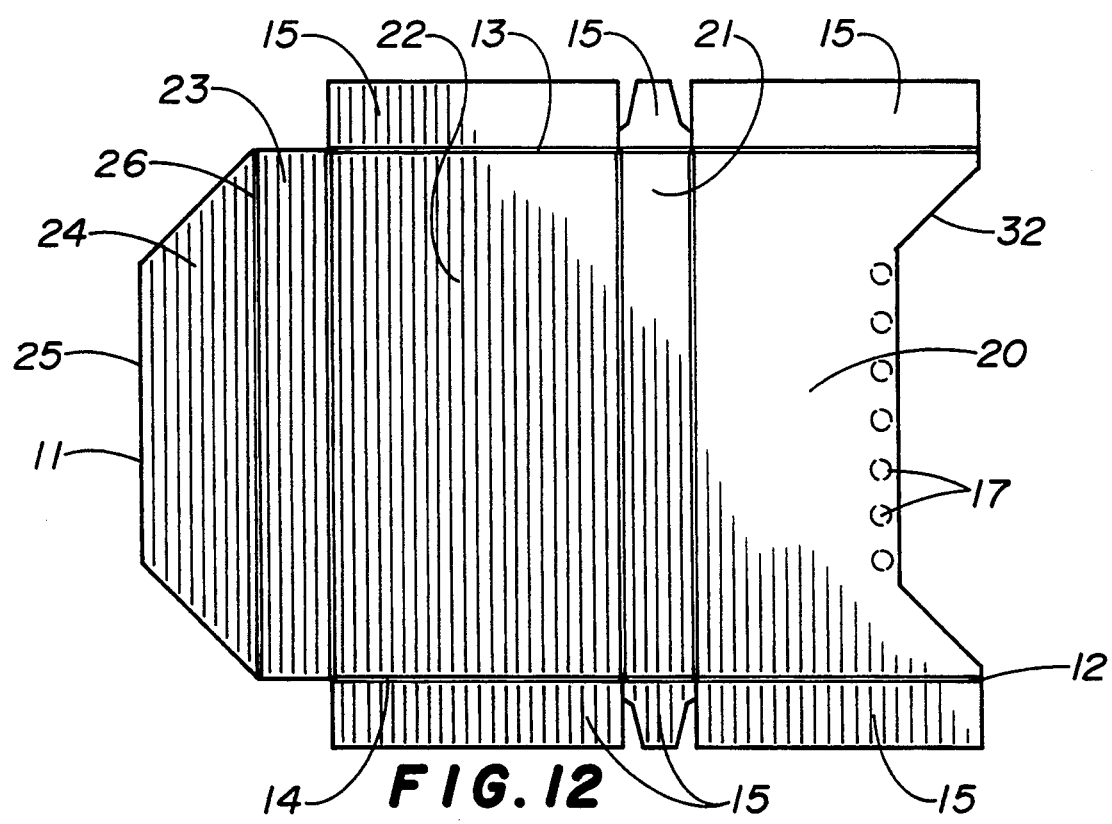
FIG. 12 is a plan view of the sheet of foldable material to form an alternate embodiment of the package.
Figure 13:
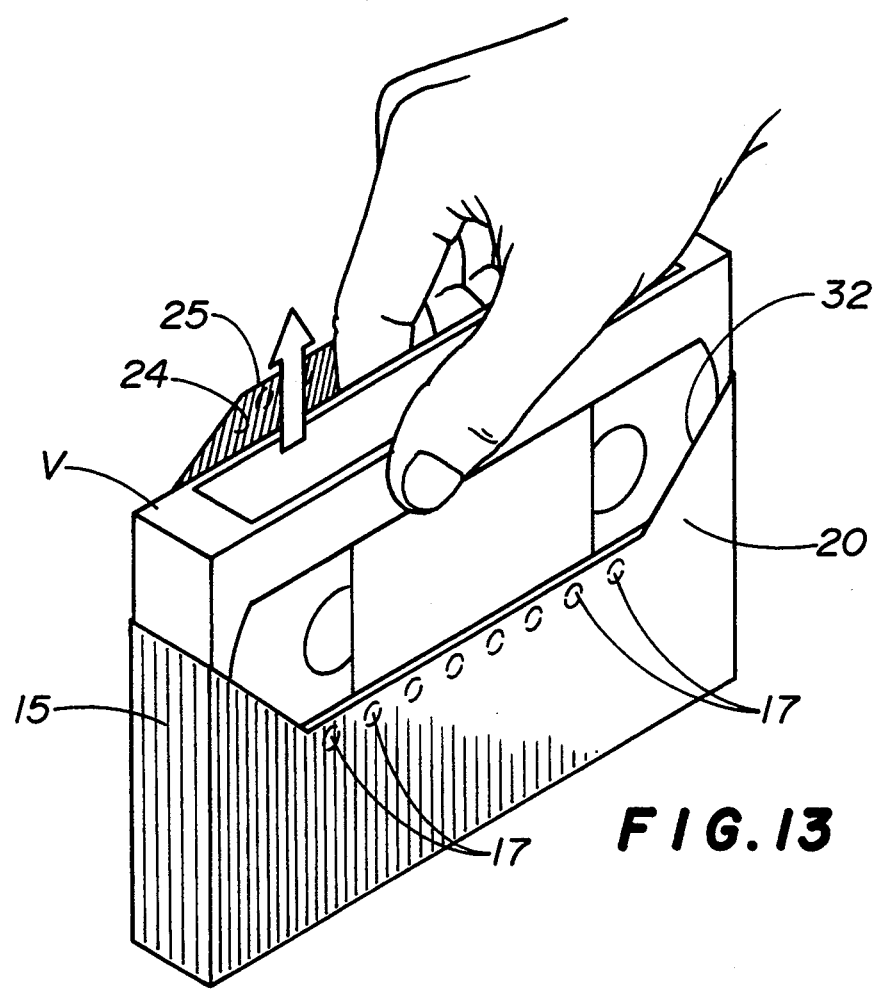
FIG. 13 is a perspective view of the recorded video means being removed from a package of the embodiment of FIG. 12.

In still a further preferred embodiment (FIGS. 12-13), no foldable panel is provided. The second end 12 of the sheet of material has a recessed portion 32 formed therein. The sheet of material is folded in the same manner as in the previously described embodiments. The covering flap 24 is removably attached to the first sidewall 20 at the lip of the cut-out portion 29 preferably by spaced-apart spots of adhesive 17 for easy lifting of the covering flap when the package is to be opened. This embodiment is most economical with respect to reduced area of sheet material with minimum assembly time and labor while still providing a protective package 10 for the recorded video means V. Further, written material may be inserted in the package 10 at the same time that the recorded video means V is inserted. The cut-out portion 29 provides rapid access to the contents of the package 10 when the cover flap 24 is lifted.

Figure 14:
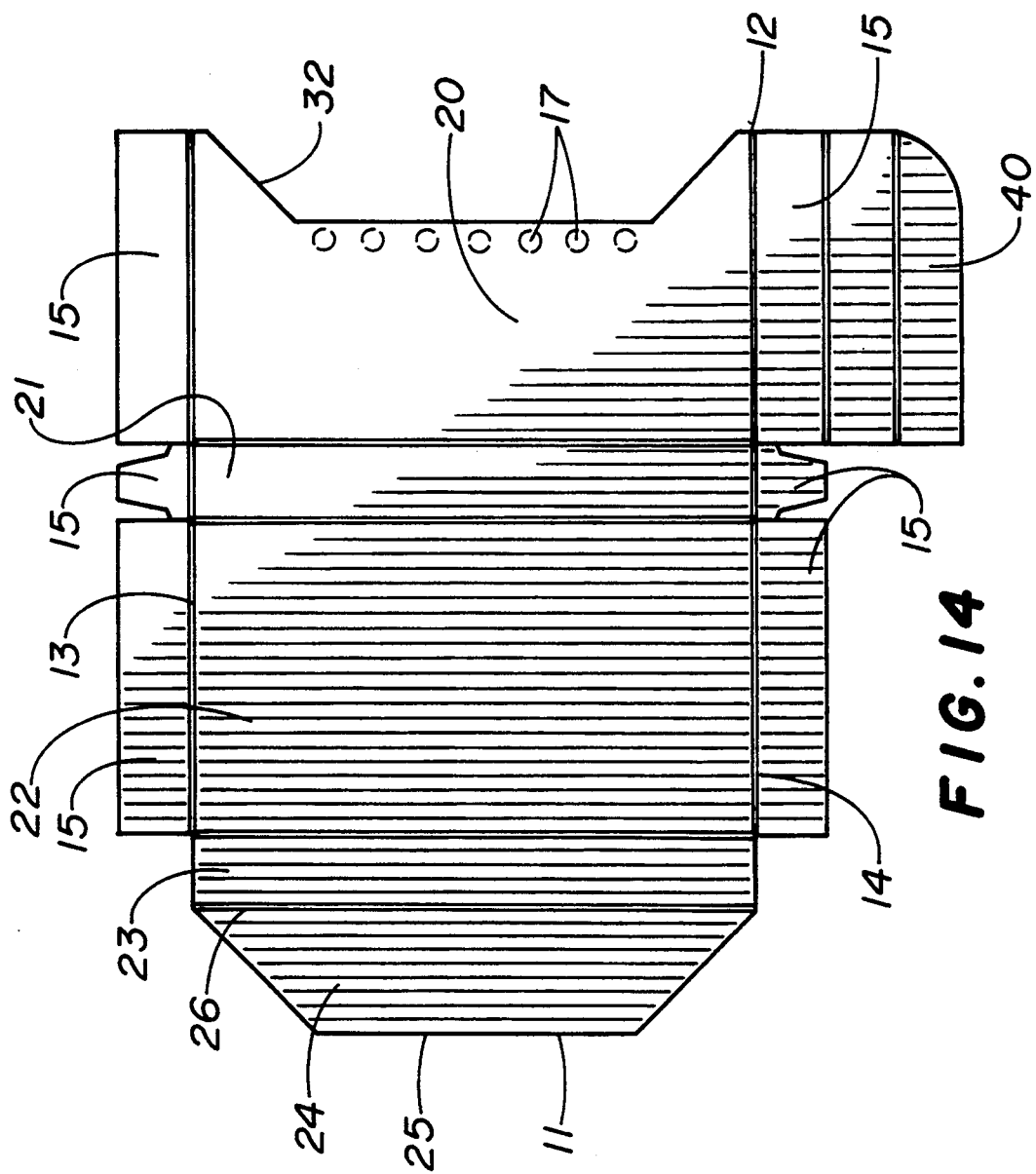
FIG. 14 is a plan view of the sheet of foldable material to form another alternate embodiment of the package in which a stop means for the written material is provided.

FIG. 14 is another embodiment in which a foldable stop 40 is attached to the tab 15 and is used as a stop means when the written material 35 is inserted into the box-like portion 16.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. A package for containing a video recording, comprising: a box portion having adjoining first, second, third and fourth sidewalls and first and second end walls, the sidewalls and the end walls being closable to retain therein the video recording, a covering flap having a first end and a second opposite end, the second end of the covering flap being joined to the fourth sidewall, the covering flap being folded and being extended partially over the first sidewall, the first end of the covering flap being removably attached to the first sidewall thereby providing an envelope appearance for the package, the first sidewall having an edge having a recessed portion on said edge, wherein when the first end of the covering flap is removably attached to the first sidewall, the recessed portion of the edge on the first sidewall is covered by the covering flap and the package is closed, and when the first end of the covering flap is disconnected from the first sidewall, the package may be opened to permit, access to the video recording within the package being facilitated by the recessed portion on the edge of the first sidewall, a panel foldably joined to the edge of the first sidewall, the panel being disposed inside the package adjacent to the first sidewall, wherein a written material may be removably inserted between the first sidewall and the panel such that a recipient of the package may be provided with advertising, informational or instructional material related to the video recording.

2. The package of claim 1, further comprising the panel having a recessed portion therein, said cut-out portion communicating with, the recessed portion in the edge of the first sidewall, thereby permitting access to the written material and the video recording when the package is opened.

3. The package of claim 1, further comprising the first sidewall having a window formed therein, wherein an address on the written material may be viewed for delivery of the package.

4. The package of claim 1, further comprising the panel having a first side tab and a second side tab, said side tabs being adjacent to the respective first and second end walls of the package, the first side tab of the panel being connected to the first end wall, wherein insertion of the inserted written material is limited and said material is disposed in a desired position within the package during assembly of the package.

5. A package for containing a video recording comprising: a box portion having adjoining first, second, third and fourth sidewalls and two end walls, the sidewalls and the end walls being closable to retain therein the video recording the box portion being collapsible and erectable, the box portion being erectable by pressure being applied on two of said opposing sidewalls, the package being expanded for permitting the containment therein of the video recording, a covering flap having a first end and a second opposite end, the second end of the covering flap being joined to the fourth sidewall, the covering flap being folded and being extended partially over the first sidewall, the first end of the covering flap being removably attached to the first sidewall, thereby providing an envelope appearance for the package, the first sidewall having an edge having a recessed portion on said edge, wherein when the first end of the covering flap is attached to the first sidewall, the recessed portion of the edge of the first sidewall is covered by the covering flap when the package is closed, and when the first end of the covering flap is disconnected from the first sidewall and the covering flap and fourth sidewall are lifted, the package may be opened to permit access to the video recording within the package facilitated by the recessed portion on the edge of the first sidewall, a panel foldably joined to the edge of the first sidewall, the panel being disposed adjacent to the first sidewall inside the package, wherein a written material may be removably inserted between the first sidewall and the panel such that a recipient of the package may be provided with advertising, informational or instructional material related to the video recording, the panel having a cut-out portion therein, said cut-out portion communicating with the recessed portion in the edge of the first sidewall, thereby permitting access to the written material and the video recording when the package is opened and the first sidewall having a window formed therein, wherein an address on the written material may be viewed for delivery of the package.

6. In a package for containing a video recording having a rectangular box configuration including four sidewalls and end walls, the sidewalls being longer than the end walls, the improvement comprising the package having a covering flap being folded and being extended partially over one of the sidewalls, the covering flap being adhered to said one of the sidewalls, the covering flap thereby providing an envelope appearance to the package, wherein access to the video recording within the box configuration is provided solely by grasping an edge of the covering flap and lifting said edge upwardly to overcome the adherence of the covering flap to said one of the sidewalls, said one of the sidewalls further having an edge having a recessed portion, said recessed portion being uncovered when the covering flap is lifted, said recessed portion facilitating grasping of the video recording for removal thereof from the package, and said recessed portion having a configuration complementary to the covering flap wherein the covering flap may be inserted into the recessed portion for reclosure of the package.

7. The package of claim 6, further comprising a segment removably attached to, and disposed in, the recessed portion on the edge of said one of the sidewalls, the covering flap being connected to said segment, wherein when the covering flap is disconnected from said one of the sidewalls to open the package, the segment is removed from the recessed portion and remains connected to the covering flap to reinforce the covering flap and to permit reinsertion of the coveting flap into the recessed portion on the edge of said one of the sidewalls for reuse of the package and storage of the video recording.

8. The package of claim 6, further comprising means for disposing a written material in the package, a window being formed in one of the sidewalls, wherein an address on the written material may be viewed for delivery of the package.

* * * * *